Nov. 23, 1937.   N. L. ETTEN   2,100,074
WRINGER RELEASE AND RESET MECHANISM
Filed Sept. 3, 1935   5 Sheets-Sheet 1
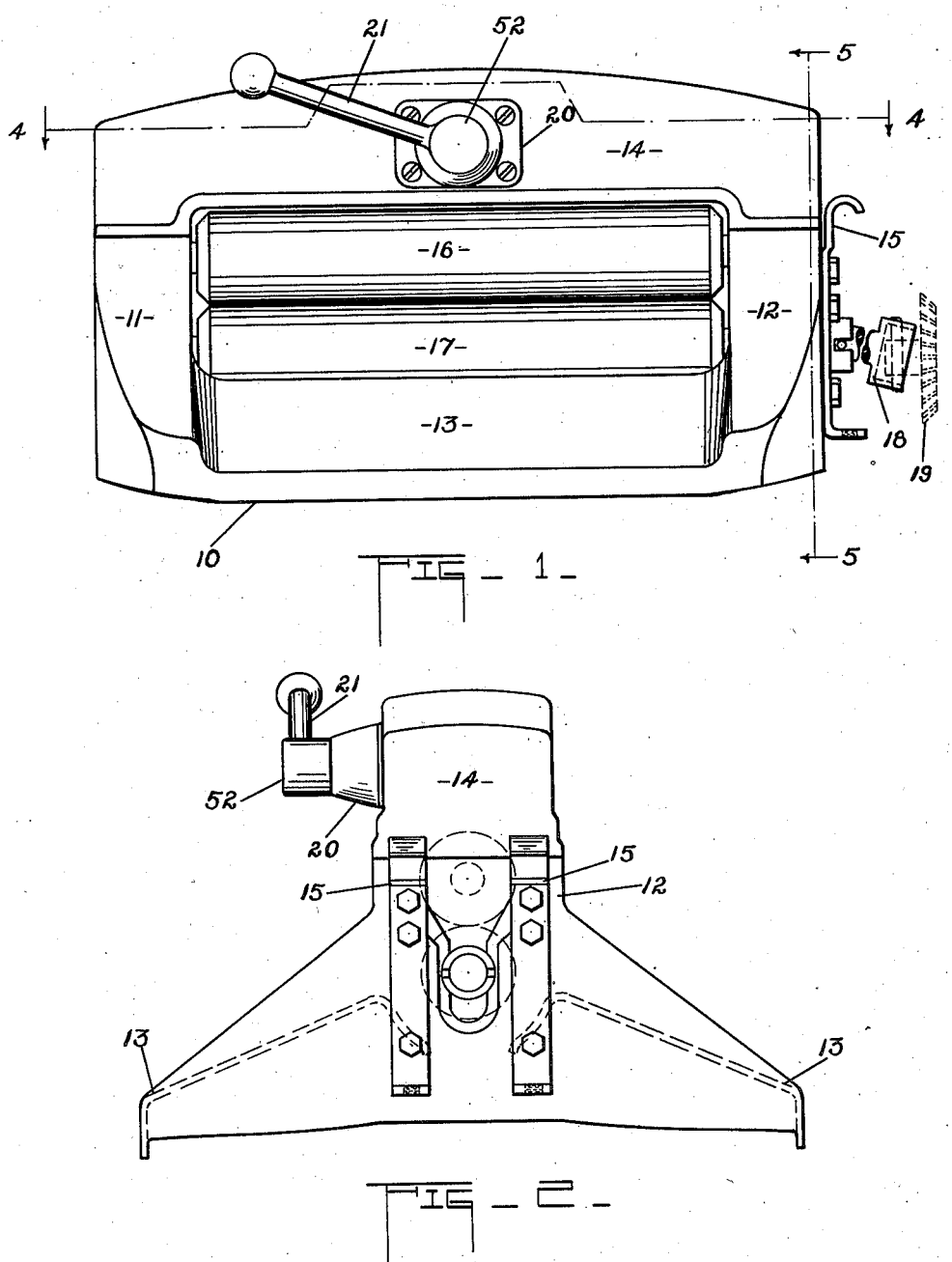

Nov. 23, 1937.  N. L. ETTEN  2,100,074
WRINGER RELEASE AND RESET MECHANISM
Filed Sept. 3, 1935   5 Sheets-Sheet 2
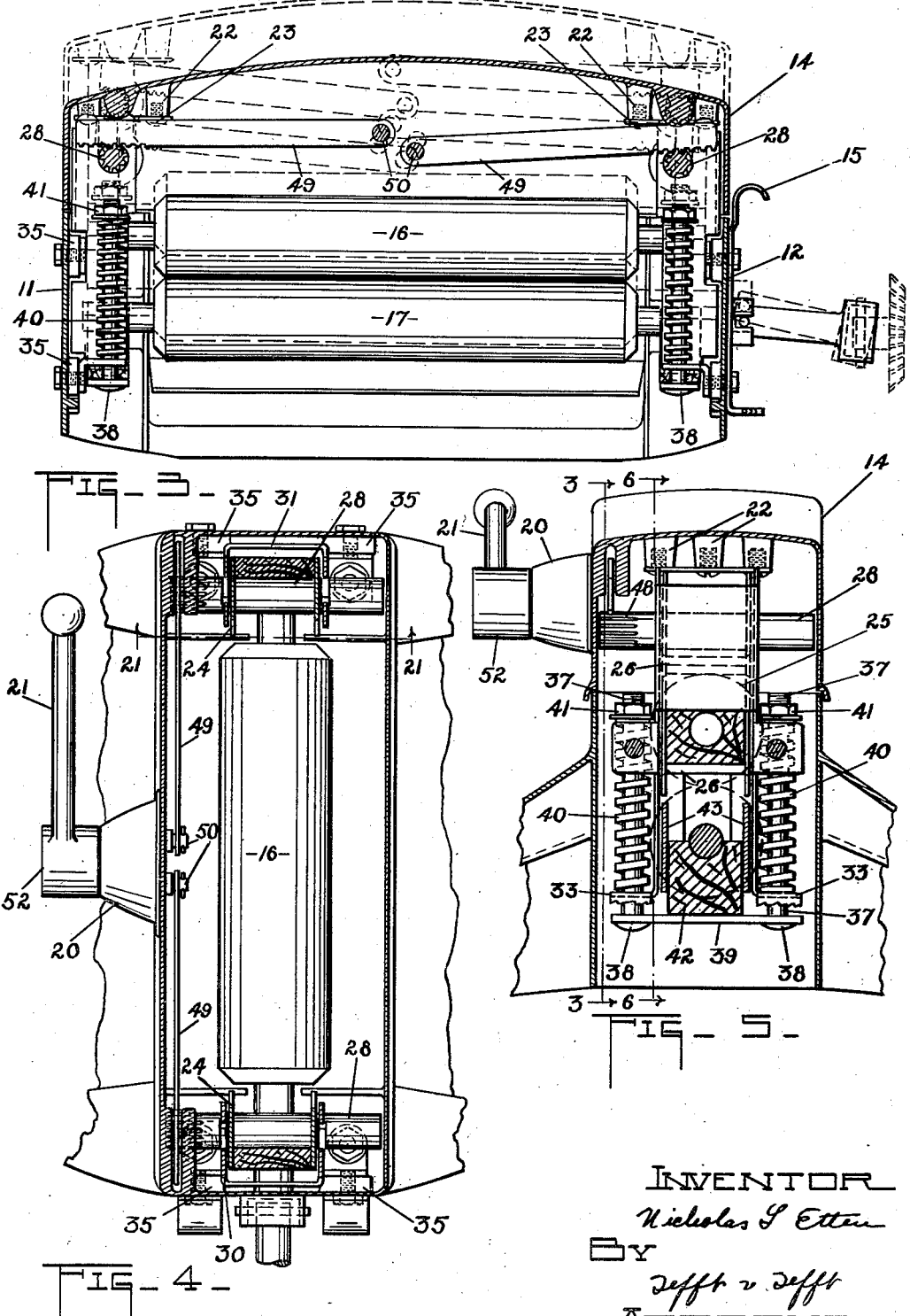

Nov. 23, 1937.  N. L. ETTEN  2,100,074
WRINGER RELEASE AND RESET MECHANISM
Filed Sept. 3, 1935  5 Sheets-Sheet 3
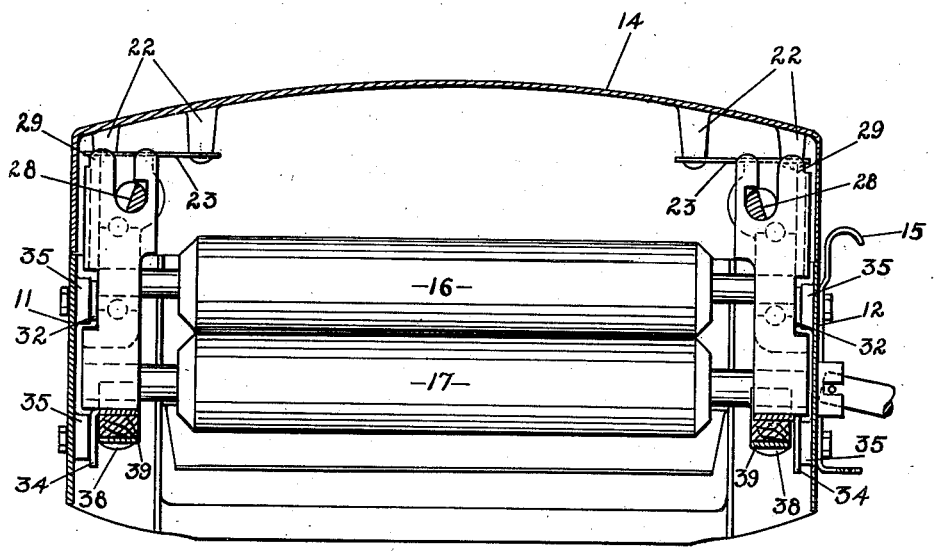
FIG_6_
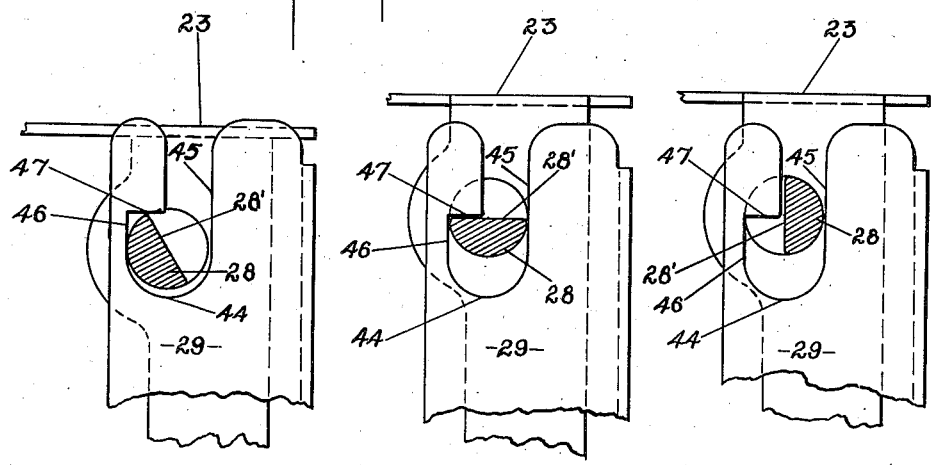
FIG_7_  FIG_8_  FIG_9_
INVENTOR
Nicholas L Etten
BY
Jeffery Jefft
ATTORNEYS Nov. 23, 1937.   N. L. ETTEN   2,100,074
WRINGER RELEASE AND RESET MECHANISM
Filed Sept. 3, 1935   5 Sheets-Sheet 4
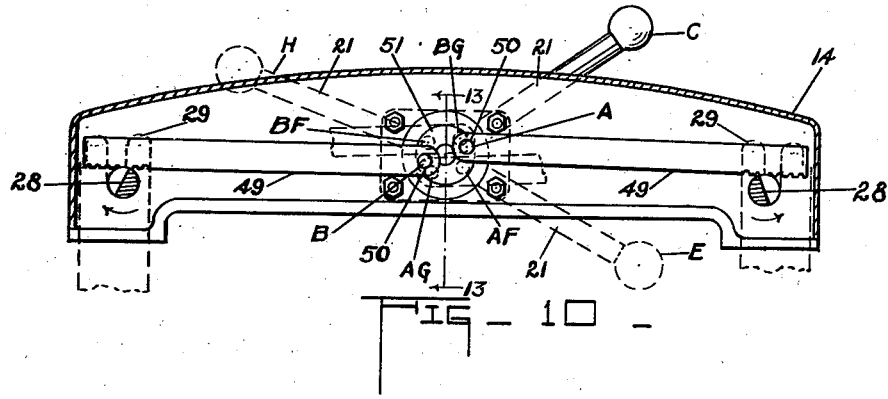
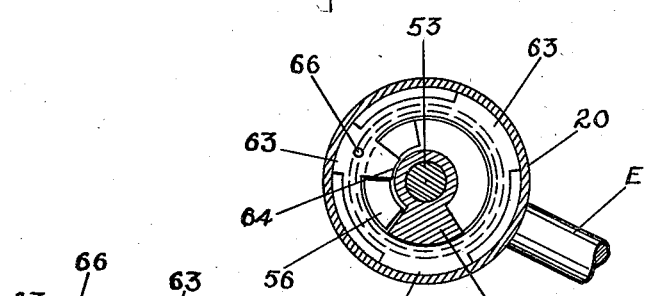
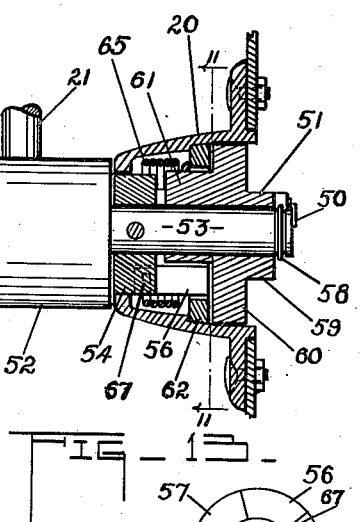
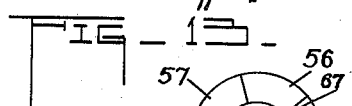
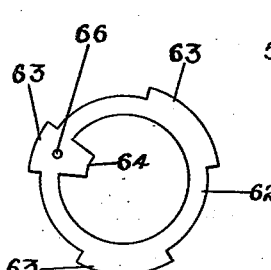
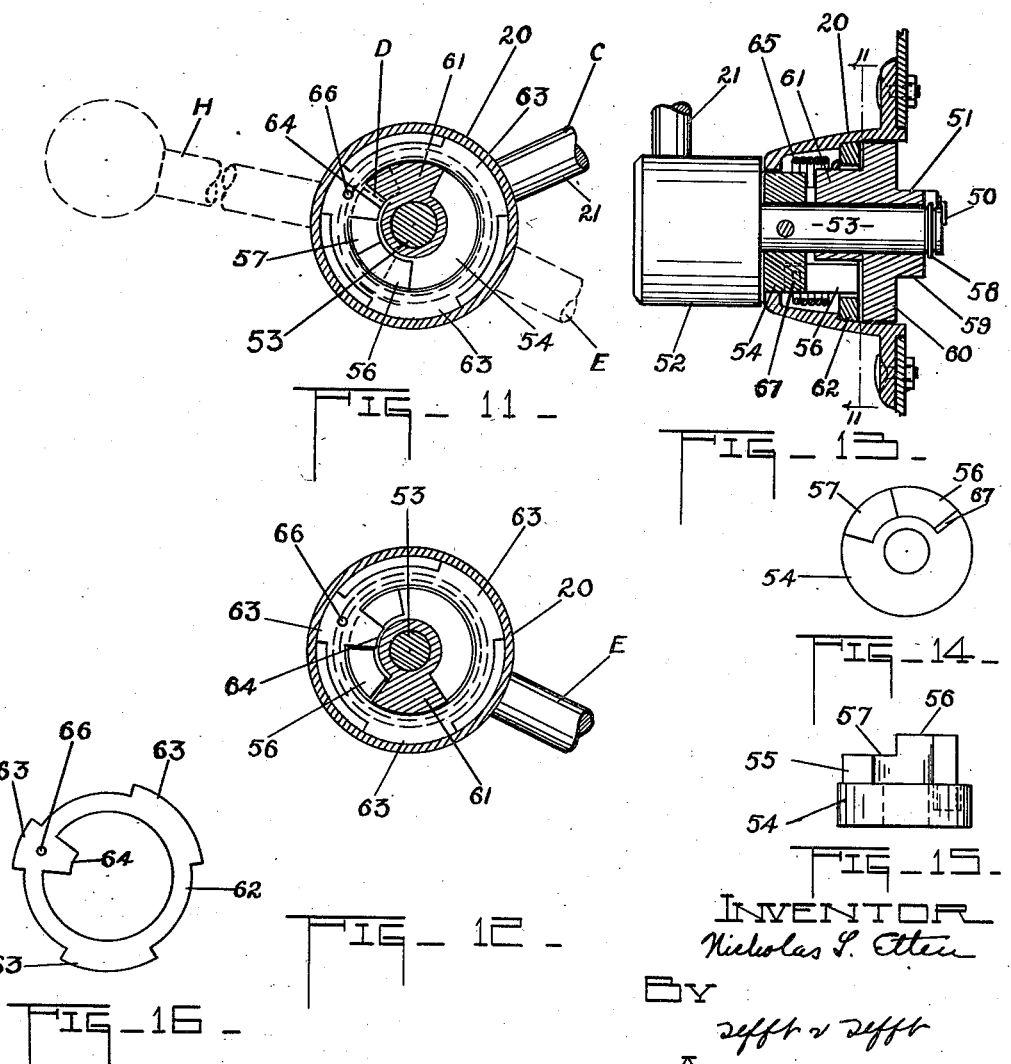
INVENTOR
Nicholas L. Etten
BY
Jefft & Jefft
ATTORNEYS

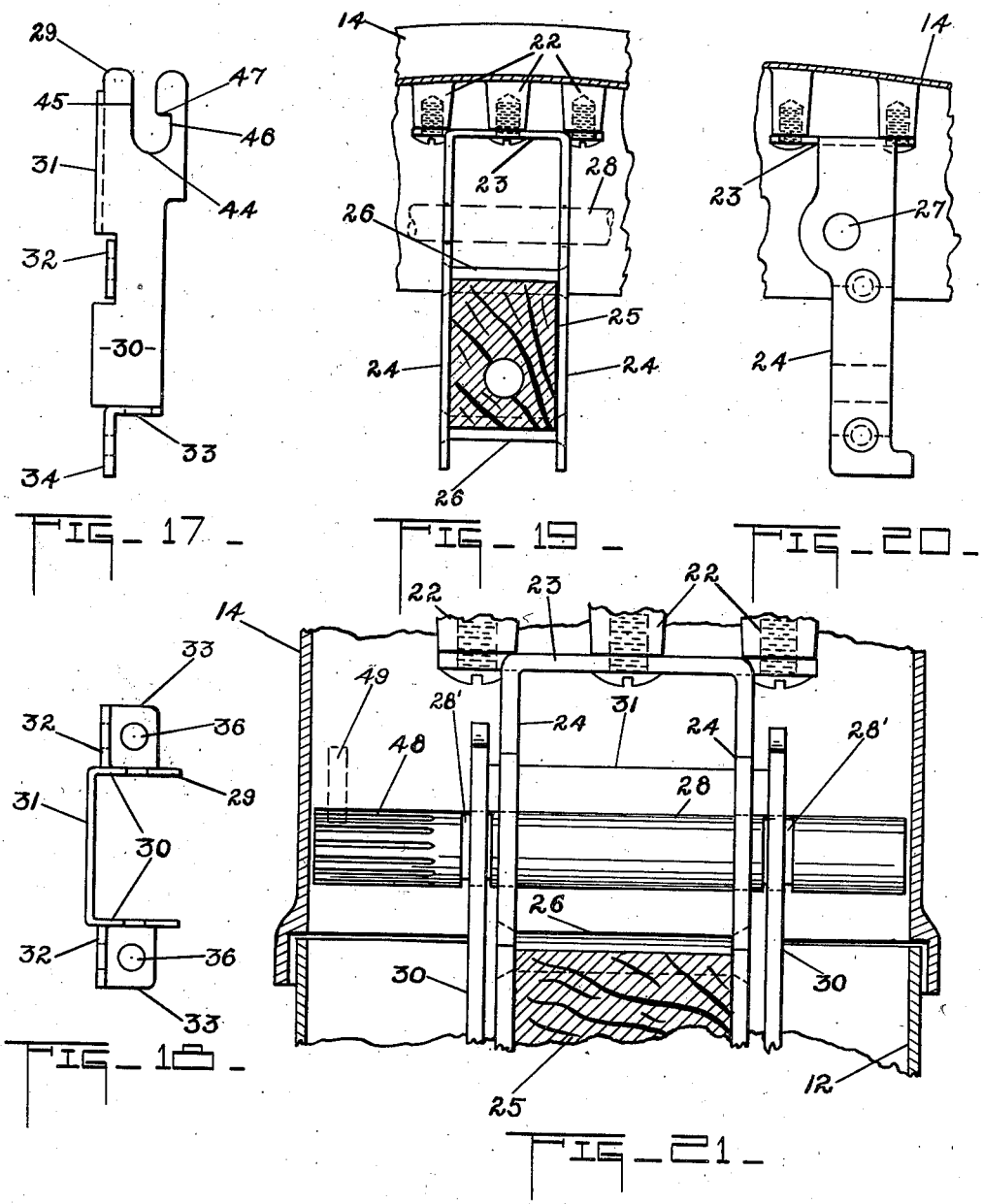

Patented Nov. 23, 1937

2,100,074

UNITED STATES PATENT OFFICE 2,100,074

WRINGER RELEASE AND RESET MECHANISM

Nicholas L. Etten, Waterloo, Iowa, assignor to Chamberlain Corporation, Waterloo, Iowa Application September 3, 1935, Serial No. 38,934

2 Claims. (Cl. 68—32)

This invention has reference to wringer release and reset mechanisms, one of the objects of which is to provide novel means for locking a wringer top frame upon a lower frame whereby to hold the wringer roll pressure means active to press the rolls together.

Another object is to provide a novel locking means as aforesaid, which locking means is instantly releasable to render the roll pressure means inactive.

A further object is to provide a locking means as aforesaid which is instantly releasable and includes mechanism by means of which, once released, the top frame is easily and quickly restored to its original locked position.

Other objects will appear in the following description and accompanying drawings in which;

Fig. 1 is a side elevational view of a wringer embodying my invention;

Fig. 2 is an end view of the same;

Fig. 3 is a side elevational sectional view taken on line 3—3 in Fig. 5;

Fig. 4 is a plan view taken approximately on line 4—4 in Fig. 1;

Fig. 5 is an end elevational view taken on line 5—5 in Fig. 1;

Fig. 6 is a side elevational view taken on line 6—6 in Fig. 5;

Figs. 7, 8, and 9 are fractional elevational views showing details of mechanism to be described.

Fig. 10 is a side elevational view showing parts and movement of mechanism to be described;

Fig. 11 is a detail sectional view taken on line 11—11 in Fig. 13;

Fig. 12 is a detail sectional view similar to Fig. 11 showing certain parts in operated position;

Fig. 13 is a fragmental sectional view taken on line 13—13 in Fig. 10.

Figs. 14 and 15 are top and side elevational views respectively showing a member of the apparatus to be referred to;

Figs. 16 is a plan view of an element of the mechanism;

Figs. 17 and 18 are side elevational and plan views respectively showing details of a part to be referred to;

Figs. 19 and 20 are end and side elevational views respectively showing an associated part; and Fig. 21 is an enlarged fragmental elevational view showing details of assembly of parts.

My invention is disclosed as embodied in a roll wringer mechanism which includes a lower frame 10 having upright portions 11 and 12 and conventional drain board extensions 13.

The frame structure includes a top frame member 14, also bracket members 15 for the purpose of attachment to a supporting structure not shown.

In the lower frame are disposed upper and lower rollers 16 and 17, and a coupling mechanism 18 affords driving connection between the roll 17 and a power source not shown, through a gear 19 shown in dotted outline.

The top frame 14 carries a fixture 20 and an operating handle 21 which latter has connection with release and resetting mechanism disposed inside the top frame as will be explained.

Reference to Figs. 3, 4, 5, and 19 will disclose that top frame 14 is provided at both ends with depending lugs 22 to which are attached fixtures 23 including dual downwardly extending side portions 24 spaced apart so as to receive between them bearing blocks 25 made from impregnated wood or any suitable bearing material.

The bearing blocks are secured between the portions 24 by means of rivets 26 and carry the shaft of upper wringer roll 16. By the means described, the upper roll is supported in fixed relation to the upper frame 14.

Journalled in openings 27 of portions 24 are transversely disposed shafts 28, which will be referred to later.

Attached to the inner surfaces of the outer walls of upright portions 11 and 12 are fixtures 29 (Figs. 17—18) which are made up to include parallel side portions 30 joined by a connecting portion 31. The side portions are provided with outwardly diverted attachment extensions 32 and outwardly extending horizontal portions 33 from which depend vertical attachment portions 34.

The fixtures 29 are secured to the frame upright portions by means of screws which pass through lugs 35 properly disposed on the upright walls to register with portions 32 and 34 of the fixtures.

Slidably mounted in openings 36 of portions 33 are upright rod members 37 which have headed portions 38 upon which transverse members 39 are supported.

Confined on rods 37 are coil springs 40 which rest upon horizontal portions 33 of fixtures 29 and react between the latter and nuts 41 on the upper ends of the rods to resiliently force member 39 upwardly as will be apparent.

Referring to Fig. 5, transverse members 39 support bearing blocks 42. The blocks are slidably supported between upright guides 43 which extend outwardly from the inner walls of uprights 11 and 12. The blocks carry the ends of the shaft of lower roll 17.

The foregoing will make apparent that the springs 40 are, through the mechanism described, capable of resiliently forcing the lower roll upwardly. The utility of this will be explained shortly.

The top frame 14 is obviously made separable from the lower frame structure. It is adapted to rest upon upright portions 11 and 12 and its lower edges are so formed as to slightly overlap the upper edges of the end uprights so that the top frame is retained in proper register therewith. The relative positions of upright 12 and top frame 14 are clearly indicated in Fig. 21.

Upper roller 16 is so disposed with respect to the top frame that when the latter rests upon the top of the uprights, the upper roll contacts the lower roll and holds the same in lowered position in opposition to the pressure of springs 40. The relative positions of the mechanism, when in lowered position, are shown in Fig. 5.

To force the top frame downwardly and hold the same in the above described working position, I provide a mechanism as follows:

Shafts 28 have already been noted as being journalled in fixtures 23.

Referring to Fig. 6, it will be noted that the upper ends of side portions 30, of fixture 29, are provided with recesses which have arcuate bottom portions 44, a tangent side 45 extending upwardly therefrom to the top of the fixture, an opposite tangent side 46 extending a short distance, the line of which then diverts inwardly to form a horizontal edge 47 thence on a vertical line to the top of the fixture.

As shown best in Figs. 6 and 21, the shafts 28 pass through the portions 30 of fixtures 29 to lie in the recesses just described. At the points opposite the portions 30, the shafts are cut away so as to have half circle cross sections. The cut away portions are designated 28'. The form is also shown in Figs. 7 to 9.

The shafts are provided with gear teeth 48 which are engaged by rack bars 49, the inner ends of which are pivotally attached to studs 50 which are eccentrically mounted on an extending portion 59 of a member 51 of an actuating mechanism enclosed in the fixture 20.

Referring to Figs. 10 to 13, the actuating mechanism includes the operating handle 21 attached to a hub 52 which carries an affixed shaft 53 which extends within the wall of the top frame.

Affixed to shaft 53 is a collar member 54 which has a lug portion 55, one side of which is cut away as shown in Figs. 14 and 15 to form upper and lower step portions 56 and 57.

The member 51 is rotatably confined on shaft 53 by means of a keeper ring 58. The studs 50 are disposed in diametrically opposite positions on a hub or boss portion 59. An enlarged flange portion 60 is fitted for rotation within the shell of fixture 20 and carries a lug portion 61.

A ring member 62 is disposed so as to be adjacent the inner surface of the flange 60 of member 51.

Member 62 is provided with extending portions 63. The inner surface of fixture 20 is cut away to receive the portions 63 in tight relationship so that the ring is firmly supported in the fixture.

The inner periphery of the ring 62 has a tooth portion 64.

Surrounding the body of member 54 is a coil spring 65 which has one end anchored in an opening 66 of the stationary ring 62 and its opposite end attached at 67 in member 54.

Operation of the mechanism just described is as follows:

It has already been noted that fixtures 29 are secured to the lower frame and that fixtures 23, carrying shafts 28, are secured to the top frame.

Fig. 9 illustrates that shaft 28 may be rotated to arrange the face 28' to permit free movement of shaft 28, and the top frame structure, upwardly whereby the top frame mechanism, including upper roll 16, may be removed from the lower frame.

Rotation of shaft 28 in clockwise direction, Figs 7 to 9, brings about engagement of face 28' with portion 46 of fixture 29 as in Fig. 8, and continued rotation eventually positions shaft 28 as shown in Fig. 7. Obviously, during the rotation described the fixture 23, together with the top frame and upper roll 16, is moved downwardly so as to force roll 16 against the lower roll 17 in opposition to springs 40 as has already been noted.

So long as the shaft 28 is held in the rotated position shown in Fig. 7, rolls 16 and 17 will be retained in pressure contact with the pressure of springs 40 applied at the upper edge of face 28' which rests somewhat off center as shown.

Upon release of shaft 28 it is free to rotate counterclockwise through the position of Fig. 8 to the position of Fig. 9. Springs 40 will obviously force such rotation by reason of the cam action between faces 46 and 28'.

The function of rack bars 49, operated by the mechanism detailed in Figs. 10 to 16, will now become apparent.

With the parts disposed as shown in Fig. 10, wherein the shafts 28 are arranged in holding position as in Fig. 7, the operating mechanism is arranged as in Fig. 11 with studs 50 rotated to the positions designated A and B.

The force of springs 40 obviously tends to rotate shafts 28 in the direction shown by the arrows, which would normally rotate member 51 counter-clockwise in Fig. 10. Assuming that member 51 is prevented from rotating responsively to springs 40 it will be clear that the mechanism, once placed in the position shown, is capable of sustaining the wringer rolls in pressure relationship by the means above described.

The position of studs 50 shown in Fig. 10 corresponds to the position of the operating mechanism shown in Fig. 11 wherein the portion 61 of member 51 rests against portion 64 of the stationary ring 62 and is thus prevented from rotating.

In this position the forward edge of step 57, it lying under portion 64, rests against portion 61 at D and handle 21 lies in position C.

With the parts in above positions, it will be apparent that manipulation of handle 21 toward the position E will engage step 57 with portion 61 to rotate the latter, with studs 50, to position AF and BF whereupon the pressure of springs 40 becomes active to force continued rotation of the studs toward release positions AG and BG which corresponds to the Fig. 9 position of shaft 28 and with the position of parts shown in Fig. 12, wherein portion 61 rests against portion 56 and the latter rests against portion 64. Thus pressure between the rolls is released.

To reset the mechanism, handle 21 is rotated counter-clockwise toward position H, thus rotating portion 56 to engage and force portion 61 and studs 50 into original position.

Spring 65 normally biases handle 21 toward position C so that when the resetting stroke of the handle is completed, that is, when portion 61 and studs 50 are replaced in self supporting position, handle 21 normally returns to position C in position for release movement to position E.

The foregoing has described my invention, modifications of structure and function are obviously possible without alteration of the principle invloved.

I do not wish to be limited in structure or function except within the scope of the appended claims.

What I claim is:

1. A roll wringer mechanism including in combination a lower frame, a detachable upper frame, a lower roll mounted for vertical movement in the lower frame, pressure means normally forcing said roll upwardly, an upper roll supported by the top frame in position to force the lower roll downwardly when the top frame is held in position on the lower frame, means for releasably locking the upper frame on the lower frame comprising a cam surface supported in each end of the lower frame, a shaft disposed crosswise of the top frame at each end thereof, each carrying a cam co-operative with one of said cam surfaces of the lower frame and mechanism in the upper frame to rotate said cams to bring about locking relationship between said cam surfaces and cams to lock the upper frame upon the lower frame.

2. A roll wringer mechanism comprising a lower frame, a separable top frame, a lower roll supported in the lower frame, an upper roll supported by the top frame and disposed in the lower frame, pressure means for the rolls made active by movement of the top frame toward the lower frame, mechanism in the top frame operating to move the top frame toward the lower frame and to hold the former in lowered position comprising a bar disposed transversely of the top frame and mounted for rotation therein, means on the bar engaging portions of the lower frame in such a manner that rotation of the bar brings about lowering movement of the top frame and finally locking it on the lower frame, a pinion on the bar, a rack meshing said pinion movable longitudinally of the top frame to cause rotation of the bar and manual means for moving the rack.

NICHOLAS L. ETTEN.